US012709707B2

(12) United States Patent
Shi et al.

(10) Patent No.: US 12,709,707 B2
(45) Date of Patent: Aug. 18, 2026

(54) METHOD FOR GROWING BIMODAL-SIZED INAS/GAAS QUANTUM DOTS, QUANTUM DOT, AND QUANTUM DOT COMPOSITION

(71) Applicant: SOOCHOW UNIVERSITY, Suzhou (CN)

(72) Inventors: Zhenwu Shi, Suzhou (CN); Biao Geng, Suzhou (CN); Changsi Peng, Suzhou (CN); Qiuyue Qi, Suzhou (CN); Gaojun Zhang, Suzhou (CN); Zequn Zhu, Suzhou (CN); Zhaoxiang Han, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 743 days.

(21) Appl. No.: 18/196,393

(22) Filed: May 11, 2023

(65) Prior Publication Data

US 2023/0340325 A1 Oct. 26, 2023

Related U.S. Application Data

(63) Continuation of application No. PCT/CN2022/101014, filed on Jun. 24, 2022.

(30) Foreign Application Priority Data

Apr. 25, 2022 (CN) ......................... 202210439135.2

(51) Int. Cl.
*C09K 11/74* (2006.01)
*C09K 11/08* (2006.01)

(52) U.S. Cl.
CPC ................................ *C09K 11/7492* (2013.01)

(58) Field of Classification Search
CPC .. C09K 11/7492; C09K 11/74; C09K 11/0883
See application file for complete search history.

(56) References Cited

U.S. PATENT DOCUMENTS

2002/0195677 A1 12/2002 Razeghi

FOREIGN PATENT DOCUMENTS

CN 1956229 A 5/2007
CN 103137789 A 6/2013
(Continued)

OTHER PUBLICATIONS

Himwas, is "Optical properties of as-grown and annealed InAs quantum dots on InGaAs cross-hatch patterns", Nanoscale Research Letters, 2011, 6:496. (Year: 2011).*

(Continued)

*Primary Examiner* — Matthew E. Hoban
*Assistant Examiner* — Lynne Edmondson
(74) *Attorney, Agent, or Firm* — SZDC Law PC

(57) ABSTRACT

The invention provides a method for growing bimodal-sized InAs/GaAs quantum dots, quantum dots, and a quantum dot composition. The method includes: S1. at a first temperature, depositing n atomic layers of InAs on a GaAs base grown with a GaAs buffer layer, where $1.4<n<1.7$; S2. at a second temperature, performing annealing to form quantum dot nuclei, where the second temperature is lower than the first temperature; and S3. continuing to deposit 1.7-n atomic layers of InAs at the second temperature, where the quantum dot nuclei form first quantum dots, when a deposition amount reaches 1.7 atomic layers, second quantum dots are formed on the flat surface between the first quantum dots, and a size of the second quantum dot is smaller than a size of the first quantum dot.

7 Claims, 7 Drawing Sheets

(56) References Cited

FOREIGN PATENT DOCUMENTS

| | | |
|---|---|---|
| CN | 103194793 A | 7/2013 |
| CN | 106356280 A | 1/2017 |
| CN | 106571292 A | 4/2017 |

OTHER PUBLICATIONS

S. Liang et al., "Temperature-dependent bimodal size evolution of InAs quantum dots on vicinal GaAs(100) substrates" Journal of Applied Physics 100, 103503, 2006 (Nov. 16, 2006).

Guo, Zhong-sheng et al., "Photoluminescence Study of InAs/GaAs Self-Organized Quantum Dots With Bimodal Size Distribution" Journal of Applied Physics, vol. 9, No. 5, 1009-1963 (May 31, 2000).

* cited by examiner

METHOD FOR GROWING BIMODAL-SIZED INAS/GAAS QUANTUM DOTS, QUANTUM DOT, AND QUANTUM DOT COMPOSITION

This application is the National Stage Application of PCT/CN2022/101014, filed on Jun. 24, 2022, which claims priority to Chinese Patent Application No. 202210439135.2, filed on Apr. 25, 2022, which is incorporated by reference for all purposes as if fully set forth herein.

FIELD OF THE INVENTION

The present invention relates to the field of nanomaterial synthesis technologies, and specifically to a method for growing bimodal-sized InAs/GaAs quantum dots, quantum dots, and a quantum dot composition.

DESCRIPTION OF THE RELATED ART

InAs/GaAs quantum dot materials, as the most classical representatives of the III-V family of compounds, have been widely used in various optoelectronic devices. According to the quantum confinement effect, the microscopic electronic energy level structure of quantum dots is strongly modulated by the size of quantum dots, and the performance and parameters of devices that operate based on quantum dots are directly determined by the electronic energy level structure of the quantum dots. At present, the most common means to prepare InAs/GaAs quantum dots is to use S—K epitaxial growth. The size distribution of quantum dots obtained by S—K growth statistically presents a near-Gaussian distribution envelope (single size mode). Through various existing processes, the size uniformity of quantum dots can be increased (corresponding to the narrowing of the half-height width of the distribution envelope) to some extent, or the size uniformity of quantum dots can be reduced (corresponding to the widening of the half-height width of the distribution envelope) to some extent. However, for some special applications, such as the need for a wider photoelectric response spectrum or even a two-color response, it is necessary to implement a wider size distribution of quantum dots, and preferably the distribution can show two separated Gaussian envelopes, that is, a bimodal size distribution. However, no mature technology process has been reported yet.

Currently, the following three main types of methods for growing bimodal-sized InAs/GaAs quantum dots are commonly used.

In the first method, bimodal-sized InAs/GaAs quantum dots are obtained by a higher amount of InAs deposition, such as described in the literature [1] to [6]: InAs continues to be deposited after quantum dots have been formed. Due to the different nucleation positions, part of the nucleation dots absorb more InAs to form large size quantum dots, and the other part of the nucleation dots absorb less InAs to form small size quantum dots, to eventually form the bimodal-sized InAs/GaAs quantum dots.

In the second method, bimodal-sized InAs/GaAs quantum dots are obtained by increasing the growth temperature, such as described in the literature [7] to [9]: a high growth temperature is used to grow quantum dots in this method. At a higher growth temperature, part of In is desorbed from formed InAs quantum dots to form small size quantum dots, and InAs quantum dots with little desorption or no desorption are used as large size quantum dots, thereby forming the bimodal-sized InAs/GaAs quantum dots.

In the third technique, bimodal-sized InAs/GaAs quantum dots are obtained by annealing at the end of growth, such as described in the literature [10] to [13]: annealing is performed for a period of time after InAs quantum dots have been formed. In an annealing process, it is easier to aggregate to form larger dots due to the migration of In atoms, while quantum dots that are not aggregated together are used as small size InAs quantum dots. In this way, bimodal-sized InAs/GaAs quantum dots are formed.

The size distribution of quantum dots obtained by the above approaches is limited, and the size modes are not very effectively independent, that is, a bimodal distribution characteristic cannot appear statistically, and there is no scheme to implement fast and highly controllable regulation of a size mode distribution ratio.

[1] Zhou, G. Y., et al. Physica E: Low-dimensional Systems and Nanostructures 43.1 (2011): 308-311.

[2] Lee, S. J., et al. Journal of Crystal Growth 267.3-4 (2004): 405-411.

[3] Lee, H. S., J. Y. Lee, and T. W. Kim. Journal of Crystal Growth 258.3/4 (2003): 256-260.

[4] Ilahi, B., et al. Superlattices & Microstructures 36.1/3 (2004): 55-61.

[5] Franchello, F., et al. Journal of Luminescence 137 (2013): 22-27.

[6] Lee, Chang Myung, et al. Japanese Journal of Applied Physics (2005).

[7] Jung, S. I., et al. Physica E: Low-dimensional Systems and Nanostructures 33.1 (2006): 280-283.

[8] Liang, S., H. L. Zhu, and W. Wang. Journal of Applied Physics 100.10 (2006): 103503-103503-5.

[9] Porsche, J., et al. Journal of Crystal Growth 195.1 (1998): 591-595.

[10] Lee, H., et al. Applied Physics Letters 71.16 (1997): 2325-2327.

[11] Ying, Wang, et al. Jet Micro & Nano Letters 12.9 (2017): 599-604.

[12] Zhong-Sheng, Guo, W. Hai-Long, and N. Dong. Chinese Physics 9.5 (2000): 384-388.

[13] Raab, A., and G. Springholz. WILEY-VCH Verlag Berlin GmbH 224.2 (2001): 509-513.

SUMMARY OF THE INVENTION

An objective of the present invention is to provide a method for growing bimodal-sized InAs/GaAs quantum dots, quantum dots, and a quantum dot composition, to implement preparation of bimodal-sized quantum dots with an adjustable ratio between two modes.

To resolve the foregoing technical problem, the present invention provides a method for growing bimodal-sized InAs/GaAs quantum dots, including the following steps:

S1. at a first temperature, depositing n atomic layers of InAs on a GaAs substrate grown with a GaAs buffer layer, where $1.4<n<1.7$;

S2. at a second temperature, performing annealing to form quantum dot nuclei, where the second temperature is lower than the first temperature; and S3. continuing to deposit 1.7-n atomic layers of InAs at the second temperature, where the quantum dot nuclei form first quantum dots, when a deposition amount reaches 1.7 atomic layers, second quantum dots are formed on the flat surface between the first quantum dots, and a size of the second quantum dot is smaller than a size of the first quantum dot.

As a further improvement to the present invention, the first temperature ranges from 495° C. to 500° C., the second temperature ranges from 460° C. to 465° C., and the first temperature is higher than the second temperature.

As a further improvement to the present invention, in step S1, a deposition rate of InAs ranges from 0.007 atomic layer/s to 0.01 atomic layer/s, an As atmosphere is $As_4$, and intermittent deposition of In is utilized for depositing.

As a further improvement to the present invention, a pressure of $As_4$ is set to $3.4\times10^{-6}$ Torr.

As a further improvement to the present invention, in the intermittent deposition of In, one cycle includes starting deposition of In for 30 s and stopping deposition of In for 15 s, and the cycle of growth is repeated until a total equivalent deposition amount is reached.

As a further improvement to the present invention, a duration of the annealing in step S2 ranges from 3 minutes to 6 minutes.

As a further improvement to the present invention, in step S1, a thickness of the GaAs buffer layer is 500 nm.

As a further improvement to the present invention, the quantum dots are prepared by using the foregoing method for growing bimodal-sized InAs/GaAs quantum dots.

As a further improvement to the present invention, a ratio of prepared first quantum dots to second quantum dots ranges from 3.6:100 to 89:100.

A bimodal-sized quantum dot composition includes the foregoing bimodal-sized quantum dots.

The beneficial effects of the present invention are as follows: the present invention provides a process of efficiently growing InAs/GaAs quantum dots with separated bimodal size distribution, and it is only necessary to simply change one of the parameters to implement continuous adjustability from "a single large size mode distribution" to "a bimodal (size) distribution" and further to "a single small size mode distribution". For a bimodal distribution, a ratio between large and small modes is adjustable and controllable. It is clear that this greatly improves the flexibility of developing and designing quantum dot devices, and more application scenarios can be satisfied.

DETAILED DESCRIPTION OF THE PREFERRED EMBODIMENTS

Figure 1:
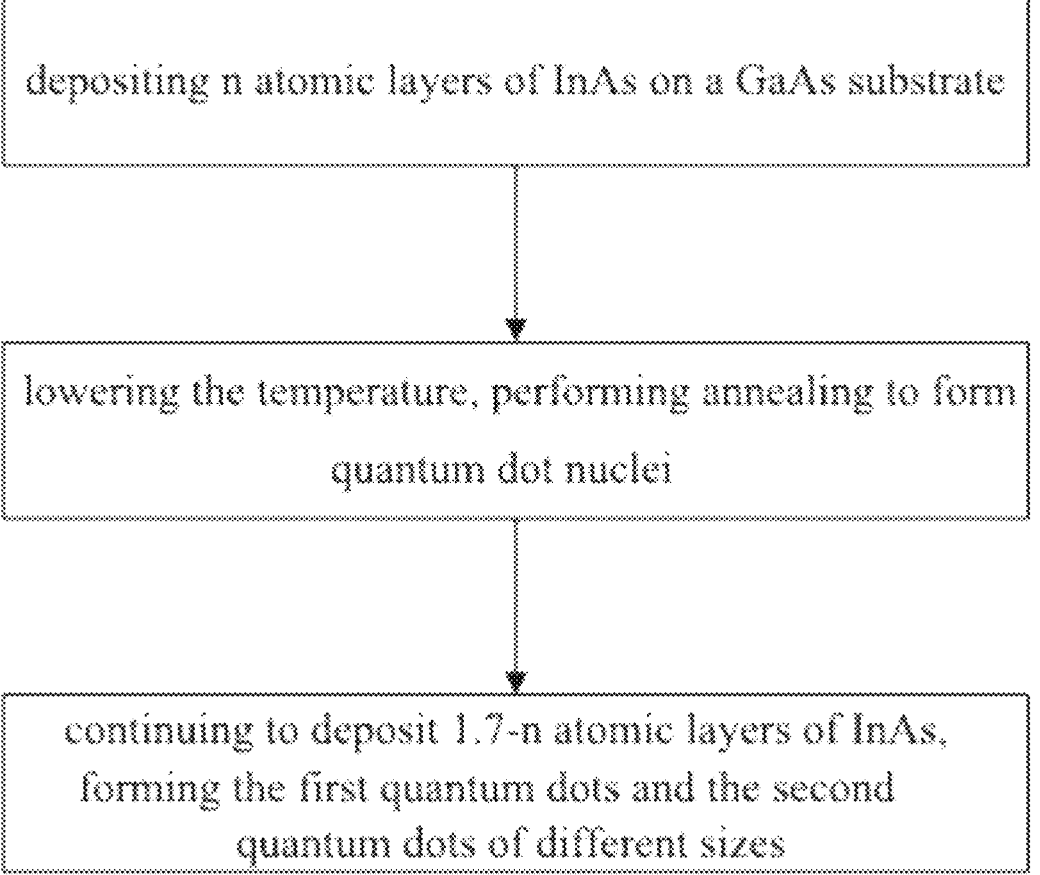
FIG. 1 is a schematic flowchart of a method according to the present invention.

The present invention is further described below with reference to the accompanying drawings and specific embodiments, to enable a person skilled in the art to better understand and implement the present invention. However, the embodiments are not used to limit the present invention.

As described in the related art, an InAs material is directly epitaxially deposited on a GaAs substrate by using a molecular beam epitaxy system. When a deposition amount exceeds a critical thickness (about 1.7 atomic layers), 3D InAs quantum dots are formed by self-assembly on a surface. The deposition amount can continue to be increased within a very limited range to obtain quantum dots with larger sizes. However, because explosive growth occurs in an S—K critical nucleation process, even if a very small amount of InAs (for example, 0.1 atomic layers) is added after nucleation, more islands of quantum dots appear. Due to the increasing density of quantum dots on the surface, as the deposition amount increases, quantum dots quickly overlap and fuse with each other and cause further dislocations due to the accumulation of stress (generally not more than 3.5 atomic layers to 4 atomic layers), which seriously affects the quality of quantum dots. In addition to changing the deposition amount in the epitaxial process, the size of quantum dots can be changed by setting different temperatures of the GaAs substrate in a temperature range suitable for the crystallization of the InAs material. Large size quantum dots may be obtained by increasing the temperature of a base, and small size quantum dots may be obtained by decreasing the temperature for nucleation. Because an S—K self-assembly growth process is a thermodynamic random process, the size of the obtained quantum dots cannot be completely consistent with a certain size distribution. In addition, on the other hand, the random nucleation process is completed within a very short period of time in an explosive manner. Therefore, the size distribution of quantum dots has a certain limited range. Therefore, for some special applications, such as the need for a wider photoelectric response spectrum or even a two-color response, it is very difficult to implement a wider size distribution of quantum dots, which cannot show two separated Gaussian envelopes, that is, bimodal size distribution.

In view of the technical problem that at present there is still no good process for preparing bimodal quantum dots (especially two size modes are separated, that is, separated enough) with adjustable ratio between two modes, referring to FIG. 1 to FIG. 4, the present invention provides a method for growing bimodal-sized InAs/GaAs quantum dots, including the following steps:

S1. at a first temperature, depositing n atomic layers of InAs on a GaAs substrate grown with a GaAs buffer layer, where $1.4<n<1.7$;

S2. at a second temperature, performing annealing to form quantum dot nuclei, where the second temperature is lower than the first temperature; and S3. continuing to deposit 1.7-n atomic layers of InAs at the second temperature, where the quantum dot nuclei form first quantum dots, when a deposition amount reaches 1.7 atomic layers, second quantum dots are formed on a surface of an atomic layer between the first quantum dots, and a size of the second quantum dot is smaller than a size of the first quantum dot.

Figure 2:
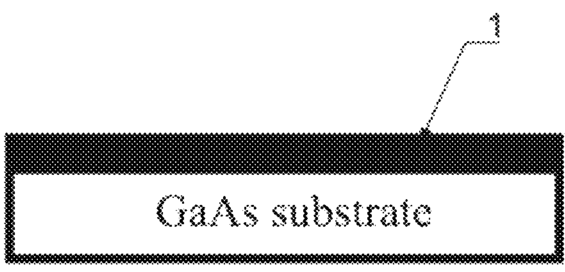
FIG. 2 is a schematic diagram of a process of implementing step S1 in a method according to the present invention.
Figure 3:
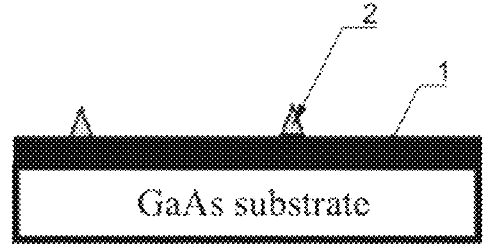
FIG. 3 is a schematic diagram of a process of implementing step S2 in a method according to the present invention.
Figure 4:
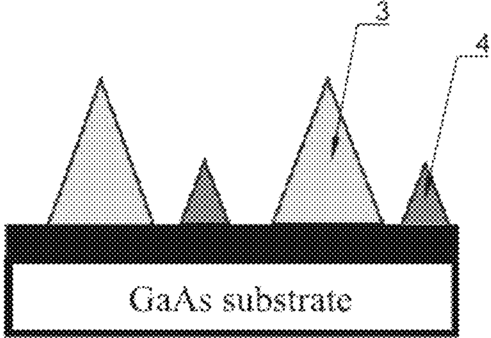
FIG. 4 is a schematic diagram of a process of implementing step S3 in a method according to the present invention.

Specifically, the present invention divides an amount of the critical thickness of InA that needs to be deposited to obtain quantum dots (generally considered to be 1.7 atomic layers) into two steps (corresponding to two different temperature points, which need to be specifically chosen) for growth. That is, as shown in FIG. 2, n (n is less than 1.7 to avoid direct nucleation at a temperature T1) atomic layers of InA are first deposited on a GaAs base grown with a GaAs buffer layer at a temperature T1 (researches find that the optimal value of T1 ranges from 495° C. to 500° C.) by using molecular beam epitaxy equipment. A deposition rate is controlled at (0.007 atomic layer/s to 0.01 atomic layer/s). The As atmosphere is preferably $As_4$. In addition, to improve the degree of migration of In atoms on the surface, a deposition manner uses a method of intermittent deposition of In. Then, as shown in FIG. 3, the temperature of the base is lowered to T2 (researches find that the optimal value of T2 ranges from 460° C. to 465° C.) and the annealing is interrupted for t minutes (researches find that the optimal value of t ranges from 3 minutes to 6 minutes) to pre-catalyze the formation of small, low-density quantum dot nuclei on the surface (to ensure the formation of such quantum dot nuclei after annealing, there is a lower limit for the previous deposition amount n at the high temperature T1 (researches find that the high temperature T1 needs to be greater than 1.4)). Then, as shown in FIG. 4, the remaining 1.7-n atomic layers of InAs (specific deposition parameters are identical as those above) continues to be deposited. This process includes two parts. In one part, the pre-formed nuclei grow rapidly to eventually form large size mode quantum dots. In the other part, when the deposition amount reaches 1.7 atomic layers (the conventional critical nucleation thickness), the surface of a flat infiltration layer between these large quantum dots follows conventional S—K self-assembly growth (corresponding to the lower temperature T2) to form another batch of small size quantum dots. The final result is that quantum dots of both size modes are obtained on the surface of the GaAs base.

Embodiment 1

This embodiment provides a method for growing bimodal-sized InAs/GaAs quantum dots, including the following steps.

1. First, a GaAs buffer layer of 500 nm is first epitaxially grown on a GaAs substrate. Then the temperature of the base is lowered to 495° C. A pressure of arsenic ($As_4$) is set to $3.4\times10^{-6}$ Torr. A growth rate of In is set to 0.0071 atomic layer/s. Next, 1.5 atomic layers of InAs is deposited, and a specific deposition process of InAs is as follows. One cycle includes starting deposition of In for 30 s and stopping deposition of In for 15 s, and the cycle of growth is repeated until a total equivalent deposition amount (an accumulated starting duration of deposition of In multiplying the growth rate of In, if a duration for depositing the remaining amount of In to be deposited in the last cycle is less than 30 s, an actually calculated duration is used, and then the deposition of In is stopped for 15 s) reaches 1.5 atomic layers, during which deposition of As is kept.

2. Then, the temperature of the base is lowered to 465° C. and annealing is interrupted for 180 s. The pressure of arsenic is still kept at 3.4×10−6 Torr.
3. After annealing ends, 0.2 atomic layers of InAs continues to be deposited at 465° C. by using a growth process same as that before (One cycle includes starting of deposition of In for 30 s and stopping deposition of In for 15 s. If a duration for depositing the remaining amount of In to be deposited is less than 30 s, an actually calculated duration is used, and then the deposition of In is stopped for 15 s). After the deposition ends, the temperature is lowered, and the base is removed to perform an AFM test.

Figure 5:
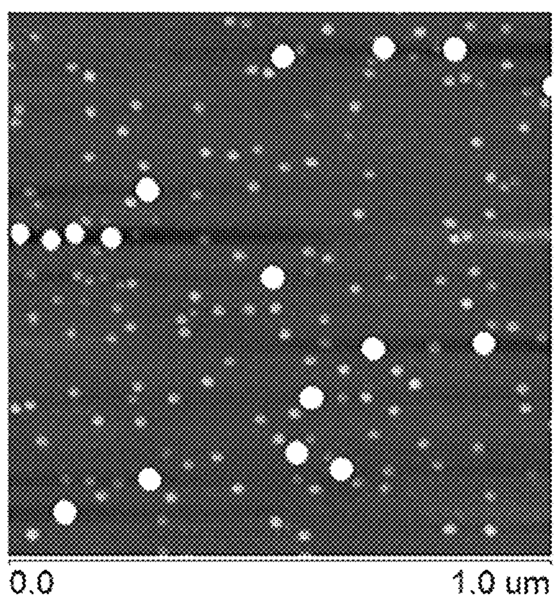
FIG. 5 is a surface display image of quantum dots according to Embodiment 1 of the present invention.
Figure 6:
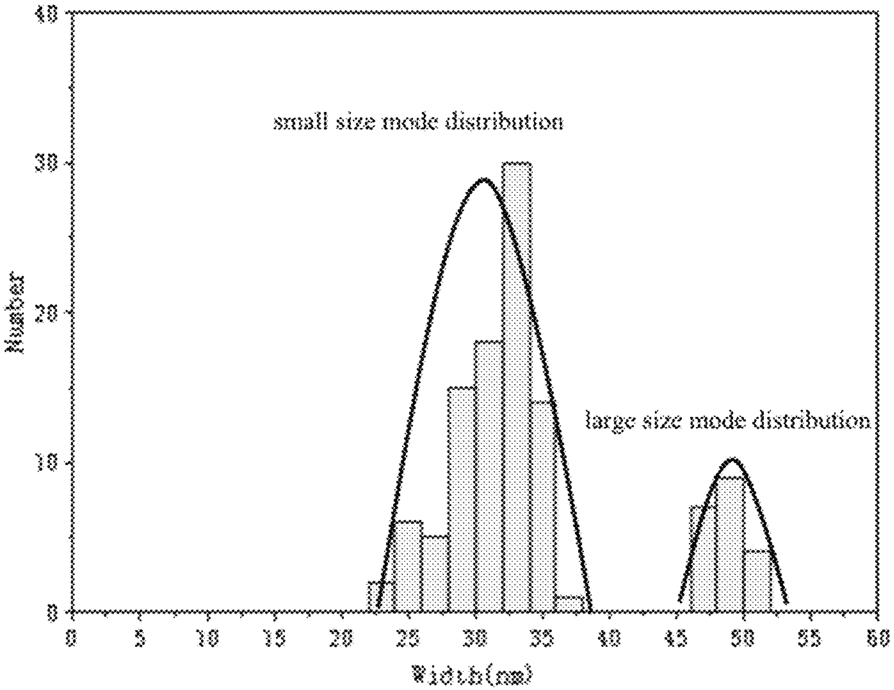
FIG. 6 is a schematic diagram of width distribution of quantum dots according to Embodiment 1 of the present invention.
Figure 7:
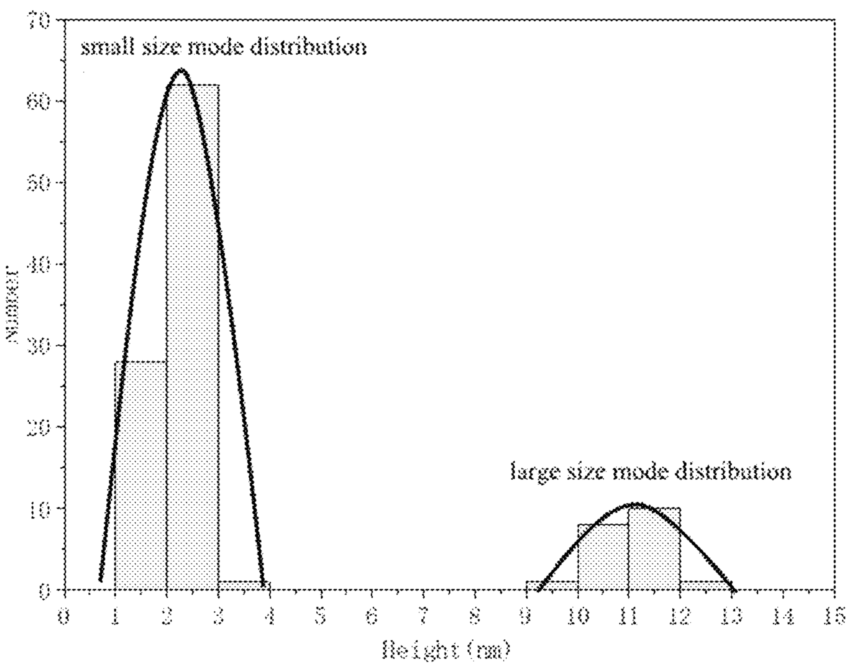
FIG. 7 is a schematic diagram of height distribution of quantum dots according to Embodiment 1 of the present invention.

Results are shown in FIG. 5 to FIG. 7. In both the width distribution and height distribution of quantum dots, a result of bimodal quantum dots can be clearly seen. In this case, a ratio of large mode quantum dots to small mode quantum dots is approximately 22:100.

Embodiment 2

A difference between this embodiment and Embodiment 1 lies in that deposition amounts at a high temperature (495° C.) and a low temperature (465° C.) are changed to: 1.4 atomic layers of InAs are deposited at 495° C., and 0.3 atomic layers of InAs are deposited at 465° C. The remaining conditions are the same as those in Embodiment 1. A specific process includes the following steps.

1. First, a GaAs buffer layer of 500 nm is first epitaxially grown on a GaAs substrate. Then the temperature of the base is lowered to 495° C. A pressure of arsenic ($As_4$) is set to 3.4×10−6 Torr. A growth rate of In is set to 0.0071 atomic layer/s. Next, 1.4 atomic layers of InAs is deposited, and a specific deposition process of InAs is as follows. One cycle includes starting deposition of In for 30 s and stopping deposition of In for 15 s, and the cycle of growth is repeated until a total equivalent deposition amount (an accumulated starting duration of deposition of In multiplying the growth rate of In, if a duration for depositing the remaining amount of In to be deposited in the last cycle is less than 30 s, an actually calculated duration is used, and then the deposition of In is stopped for 15 s) reaches 1.4 atomic layers, during which deposition of As is kept.
2. Then, the temperature of the base is lowered to 465° C. and annealing is interrupted for 180 s. The pressure of arsenic is still kept at 3.4×10−6 Torr.
3. After annealing ends, 0.3 atomic layers of InAs continues to be deposited at 465° C. by using a growth process same as that before (One cycle includes starting deposition of In for 30 s and stopping deposition of In for 15 s. If a duration for depositing the remaining amount of In to be deposited is less than 30 s, an actually calculated duration is used, and then the deposition of In is stopped for 15 s). After the deposition ends, the temperature is lowered, and the base is removed to perform an AFM test.

Figure 8:
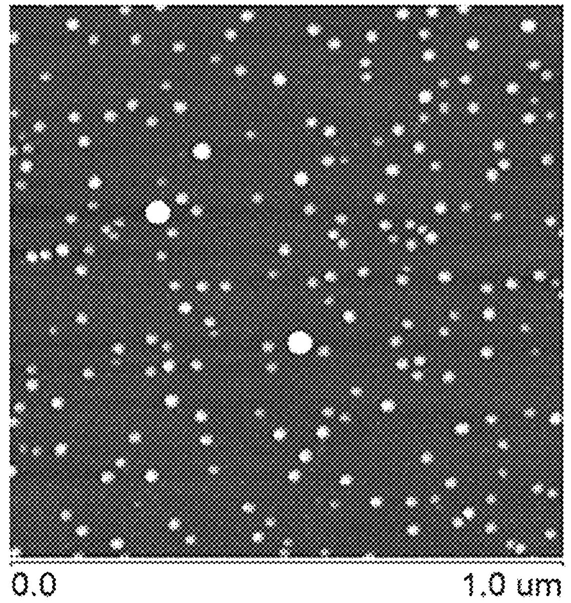
FIG. 8 is a surface display image of quantum dots according to Embodiment 2 of the present invention.
Figure 9:
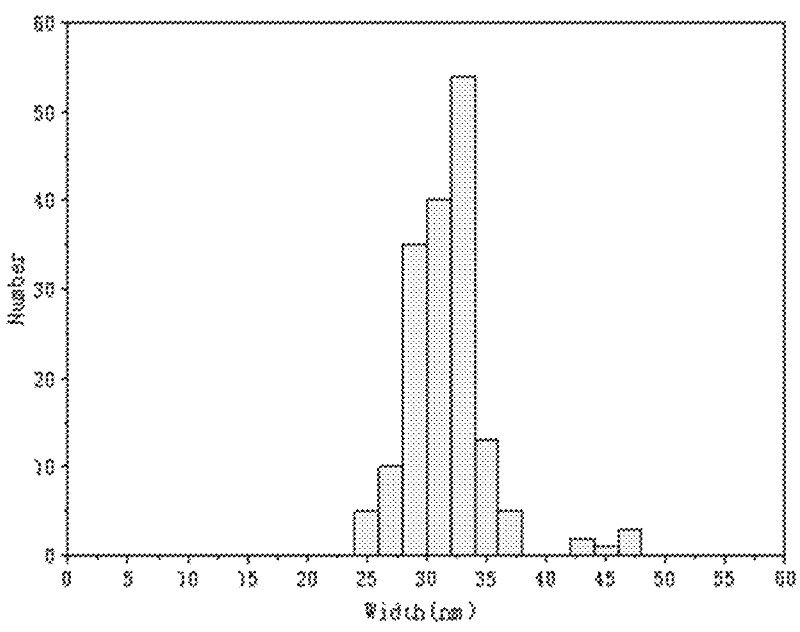
FIG. 9 is a schematic diagram of width distribution of quantum dots according to Embodiment 2 of the present invention.
Figure 10:
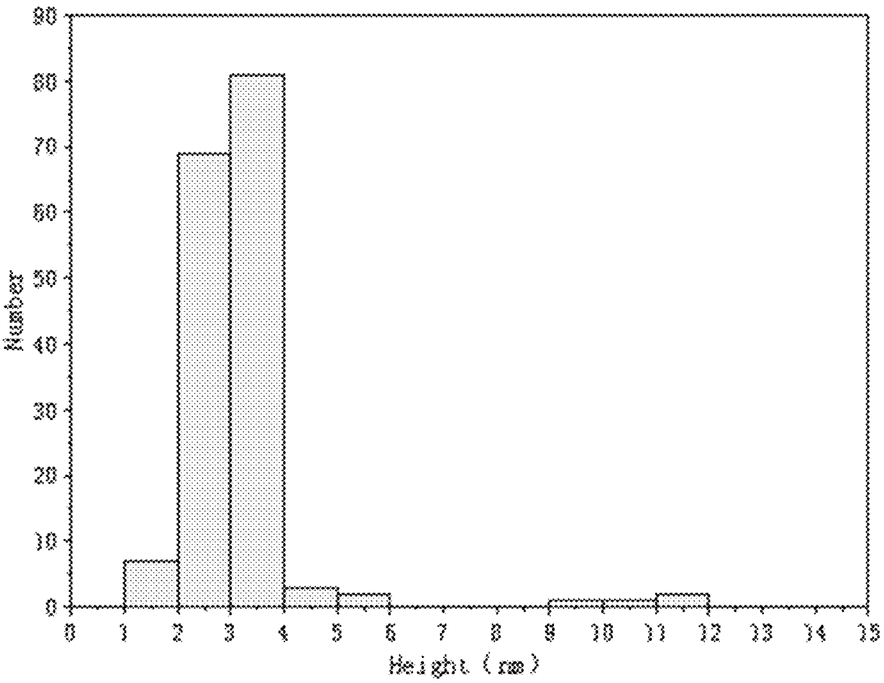
FIG. 10 is a schematic diagram of height distribution of quantum dots according to Embodiment 2 of the present invention.

Results are shown in FIG. 8 to FIG. 10. In this case, a ratio of large mode quantum dots to small mode quantum dots is approximately 3.6:100.

Embodiment 3

A difference between this embodiment and Embodiment 1 lies in that deposition amounts at a high temperature (495° C.) and a low temperature (465° C.) are changed to: 1.6 atomic layers of InAs are deposited at 495° C., and 0.1 atomic layers of InAs are deposited at 465° C. The remaining conditions are the same as those in Embodiment 1. A specific process includes the following steps.

1. First, a GaAs buffer layer of 500 nm is first epitaxially grown on a GaAs substrate. Then the temperature of the base is lowered to 495° C. A pressure of arsenic ($As_4$) is set to 3.4×10−6 Torr. A growth rate of In is set to 0.0071 atomic layer/s. Next, 1.6 atomic layers of InAs is deposited, and a specific deposition process of InAs is as follows. One cycle includes starting deposition of In for 30 s and stopping deposition of In for 15 s, and the cycle of growth is repeated until a total equivalent deposition amount (an accumulated starting duration of deposition of In multiplying the growth rate of In, if a duration for depositing the remaining amount of In to be deposited in the last cycle is less than 30 s, an actually calculated duration is used, and then the deposition of In is stopped for 15 s) reaches 1.6 atomic layers, during which deposition of As is kept.
2. Then, the temperature of the base is lowered to 465° C. and annealing is interrupted for 180 s. The pressure of arsenic is still kept at 3.4×10−6 Torr.
3. After annealing ends, 0.1 atomic layers of InAs continues to be deposited at 465° C. by using a growth process same as that before (One cycle includes starting deposition of In for 30 s and stopping deposition of In for 15 s. If a duration for depositing the remaining amount of In to be deposited is less than 30 s, an actually calculated duration is used, and then the deposition of In is stopped for 15 s). After the deposition ends, the temperature is lowered, and the base is removed to perform an AFM test.

Figure 11:
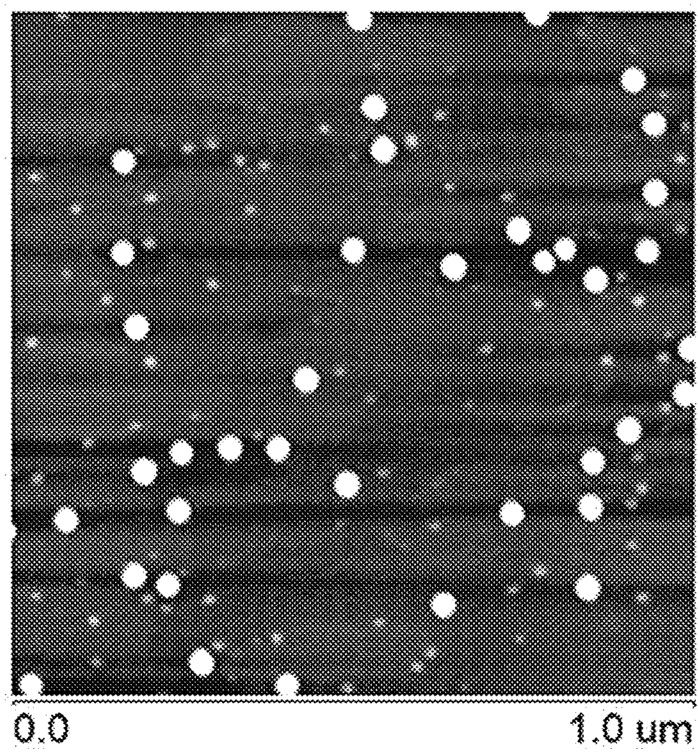
FIG. 11 is a surface display image of quantum dots according to Embodiment 3 of the present invention.
Figure 12:
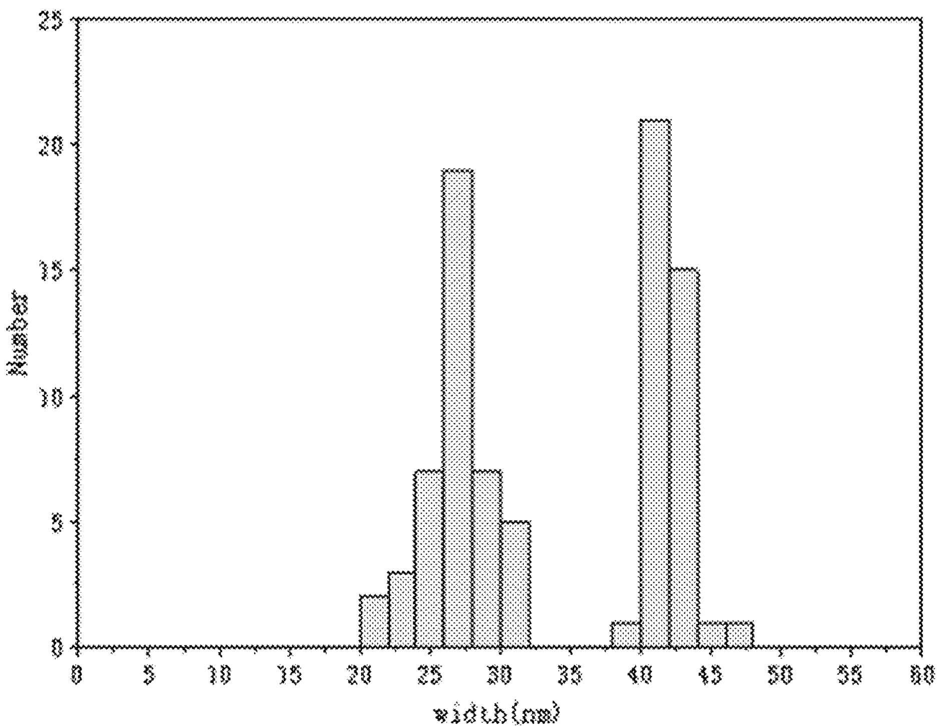
FIG. 12 is a schematic diagram of width distribution of quantum dots according to Embodiment 3 of the present invention.
Figure 13:
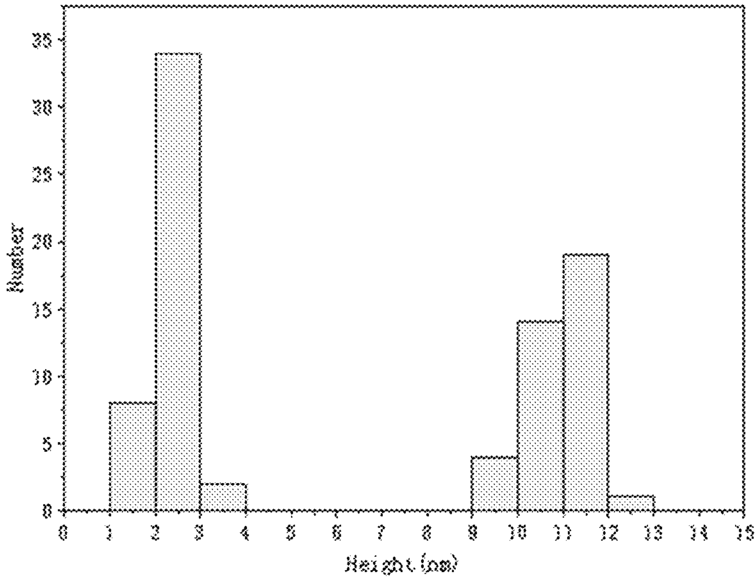
FIG. 13 is a schematic diagram of height distribution of quantum dots according to Embodiment 3 of the present invention; and Reference numerals: 1, InAs deposition layer; 2, quantum dot nucleus; 3, first quantum dot; and 4, second quantum dot.

Results are shown in FIG. 11 to FIG. 13. In this case, a ratio of large mode quantum dots to small mode quantum dots is approximately 89:100.

As can be seen by comparing Embodiments 1 to 3, it is only necessary to change the deposition amounts at the high temperature (495° C.) and the low temperature (465° C.) to modulate the ratio between large and small modes.

Therefore, in the present invention, it is only necessary to simply change one of the parameters to implement continuous adjustability from "a single large size mode distribution" to "a bimodal (size) distribution" and further to "a single small size mode distribution". For a bimodal distribution, a ratio between large and small modes is adjustable and controllable. It is clear that this greatly improves the flexibility of developing and designing quantum dot devices, and more application scenarios can be satisfied.

The present invention further provides bimodal-sized quantum dots. The quantum dots are prepared by using the foregoing method for growing bimodal-sized InAs/GaAs quantum dots.

As a further improvement to the present invention, a ratio of prepared first quantum dots to second quantum dots ranges from 3.6:100 to 89:100 (as proved by Embodiments 1 to 3).

A bimodal-sized quantum dot composition includes the foregoing bimodal-sized quantum dots.

The foregoing embodiments are merely preferred embodiments used to fully describe the present invention, and the protection scope of the present invention is not limited thereto. Equivalent replacements or variations made by a person skilled in the art to the present invention all fall within the protection scope of the present invention. The protection scope of the present invention is as defined in the claims.

What is claimed is:

1. A method for growing bimodal-sized InAs/GaAs quantum dots, comprising steps of:

S1: at a first temperature, depositing n atomic layers of InAs on a GaAs substrate grown with a GaAs buffer layer, wherein $1.4<n<1.7$;

S2: at a second temperature, performing annealing to form quantum dot nuclei, wherein the second temperature is lower than the first temperature; and S3: continuing to deposit 1.7-n atomic layers of InAs at the second temperature, wherein the quantum dot nuclei form first quantum dots, when a deposition amount reaches 1.7 atomic layers, second quantum dots are formed on a surface between the first quantum dots, and a size of the second quantum dots is smaller than a size of the first quantum dots.

2. The method for growing bimodal-sized InAs/GaAs quantum dots according to claim 1, wherein the first temperature ranges from 495° C. to 500° C., the second temperature ranges from 460° C. to 465° C., and the first temperature is higher than the second temperature.

3. The method for growing bimodal-sized InAs/GaAs quantum dots according to claim 1, wherein in step S1, a deposition rate of InAs ranges from 0.007 atomic layer/s to 0.01 atomic layer/s, an As atmosphere is $As_4$, and intermittent deposition of In is utilized for depositing.

4. The method for growing bimodal-sized InAs/GaAs quantum dots according to claim 3, wherein a pressure of $As_4$ is set to $3.4\times10^{-6}$ Torr.

5. The method for growing bimodal-sized InAs/GaAs quantum dots according to claim 3, wherein in the intermittent deposition of In, one cycle includes starting deposition of In for 30 s and stopping deposition of In for 15 s, and the cycle is repeated until a total equivalent deposition amount is reached.

6. The method for growing bimodal-sized InAs/GaAs quantum dots according to claim 1, wherein a duration of the annealing in step S2 ranges from 3 minutes to 6 minutes.

7. The method for growing bimodal-sized InAs/GaAs quantum dots according to claim 1, wherein in step S1, the GaAs buffer layer has a thickness of 500 nm.

* * * * *